United States Patent
Lv et al.

(10) Patent No.: US 11,759,033 B1
(45) Date of Patent: Sep. 19, 2023

(54) PORTABLE FLASHLIGHT THERMOS CUP WITH CHARGING FUNCTION

(71) Applicant: Zhejiang Ansheng Technology Co., Ltd., Jinhua (CN)

(72) Inventors: Zhengjian Lv, Jinhua (CN); Qiuxia Luo, Jinhua (CN); Yujian Liang, Jinhua (CN)

(73) Assignee: ZHEJIANG ANSHENG TECHNOLOGY CO., LTD., Jinhua (CN)

( * ) Notice: Subject to any disclaimer, the term of this patent is extended or adjusted under 35 U.S.C. 154(b) by 0 days.

(21) Appl. No.: 18/106,505

(22) Filed: Feb. 7, 2023

(30) Foreign Application Priority Data

Apr. 7, 2022 (CN) .......................... 202210358830.6

(51) Int. Cl.
| | |
|---|---|
| *A47G 19/22* | (2006.01) |
| *F21L 4/08* | (2006.01) |
| *F21V 23/04* | (2006.01) |
| *F21V 23/02* | (2006.01) |
| *H02J 7/00* | (2006.01) |

(52) U.S. Cl.
CPC ..... *A47G 19/2227* (2013.01); *A47G 19/2288* (2013.01); *F21L 4/085* (2013.01); *F21V 23/023* (2013.01); *F21V 23/0428* (2013.01); *A47G 2019/2238* (2013.01); *H02J 7/00* (2013.01)

(58) Field of Classification Search
CPC ............ A47G 19/2227; A47G 19/2288; A47G 2019/2238; H02J 7/00; F21L 4/085; F21V 23/023; F21V 23/0428; F21V 33/0036
See application file for complete search history.

(56) References Cited

U.S. PATENT DOCUMENTS

| | | | | |
|---|---|---|---|---|
| 9,493,267 | B1* | 11/2016 | Citrin | ..................... B65D 47/42 |
| 9,801,482 | B1* | 10/2017 | Alexander | ........... H05B 1/0244 |
| 11,454,387 | B2* | 9/2022 | Johnwell | ................... F21L 4/00 |
| 2010/0224639 | A1* | 9/2010 | Peng | ................. A47G 19/2227 220/694 |
| 2015/0182046 | A1* | 7/2015 | Walsh | ................ A47G 19/2227 206/459.5 |
| 2016/0284965 | A1* | 9/2016 | Makosinski | ....... A47G 19/2227 |
| 2016/0286993 | A1* | 10/2016 | Pau | ..................... A47G 19/2288 |

(Continued)

*Primary Examiner* — Zheng Song
(74) *Attorney, Agent, or Firm* — Bayramoglu Law Offices LLC (57) ABSTRACT

A portable flashlight thermos cup with a charging function includes: a flashlight thermos cup body; a lighting mechanism on the flashlight thermos cup body; and a thermal energy conversion power generation mechanism on the flashlight thermos cup body that is electrically connected to the lighting mechanism and converts thermal energy into electrical energy; a cup body; and a plastic anti-ironing part that detaches from the cup body. The flashlight cup uses thermoelectric power generation to export the heat of hot water through metal connectors and dissipates heat through heat dissipation metal sheets to generate temperature differences. The thermoelectric power generation sheet converts thermal energy into electric energy and stores the electric energy in the battery. The battery can also be charged from outside sources and used for lighting or charging mobile power supplies. The portable flashlight thermos cup is environmentally friendly and used for outdoor emergencies.

12 Claims, 7 Drawing Sheets

(56) References Cited

U.S. PATENT DOCUMENTS

| | | | | |
|---|---|---|---|---|
| 2018/0152776 | A1* | 5/2018 | Lee | B65D 43/0225 |
| 2018/0333007 | A1* | 11/2018 | Ganahl | A47J 31/005 |
| 2018/0360243 | A1* | 12/2018 | O'Neal | G09F 13/04 |
| 2021/0068567 | A1* | 3/2021 | Ganter, I | A47G 19/2227 |
| 2021/0190307 | A1* | 6/2021 | Brown | A47G 23/0225 |
| 2021/0325033 | A1* | 10/2021 | Johnwell | F21V 33/0036 |
| 2022/0214035 | A1* | 7/2022 | Brown | F21V 33/0036 |

* cited by examiner

PORTABLE FLASHLIGHT THERMOS CUP WITH CHARGING FUNCTION

CROSS REFERENCE TO THE RELATED APPLICATIONS

This application is based upon and claims priority to Chinese Patent Application No. 202210358830.6, filed on Apr. 7, 2022, the entire contents of which are incorporated herein by reference.

TECHNICAL FIELD

This invention belongs to the field of cup technology, namely, a portable flashlight thermos cup with a charging function.

BACKGROUND

Cups have been used as containers to hold liquid for the most part, people usually use them to have tea, water, beverages, etc. The thermos cup is a kind of cup which is generally made of ceramic or stainless steel with a vacuum layer, it has a cup lid with good sealing property, its vacuum insulation layer can delay the heat dissipation of liquid for heat preservation purpose, such as water. The thermos cup is developed from and has the same heat preservation principle as the thermos flask, but it is more convenient.

The existing thermos cups only have the simple function of storing hot water in actual use, but they can't be used as a flashlight when outdoor emergencies happen. It also has energy waste when storing hot water, because the water temperature suitable for human drinking is 40° C. while the temperature of boiling water it stores is 100° C., when the water temperature reduces, a large amount of thermal energy will be generated, the existing thermos cups cannot reasonably use the temperature loss, resulting in waste of heat and poor environmental protection.

SUMMARY

The present invention provides a portable flashlight thermos cup with a charging function is a cup that can be used to illuminate and store electric energy. The flashlight cup uses thermoelectric power generation to export the heat of hot water through metal connectors and dissipates heat through heat dissipation metal sheets to generate temperature differences. At the same time, the thermoelectric power generation sheet converts thermal energy into electric energy and stores the electric energy in the battery. The electric energy is stored in the battery, and the battery can not only store the electric energy but also be charged from the outside for lighting or charging mobile power supplies. On the one hand, it is very environmentally friendly, on the other hand, it can be used for outdoor emergencies.

The technical solution of the invention is as follows: A portable flashlight thermos cup with a charging function that includes:

The flashlight thermos cup body;

A lighting mechanism is arranged on the flashlight thermos cup body to realize lighting; and A thermal energy conversion power generation mechanism is arranged on the flashlight thermos cup body and electrically connected to the lighting mechanism, which converts thermal energy into electrical energy for supplying power to the lighting mechanism.

In embodiments, the flashlight thermos cup body includes:

A cup body;

A plastic anti-ironing part is detachable on the cup body.

In embodiments, the lighting mechanism includes:

An installation component is set on the plastic ironing part;

A power supply component is arranged in the installation component line for power supply;

A bulb is arranged on the power supply component and electrically connected thereto for illumination; and An auxiliary component is arranged on and electrically connected to the power supply component to display its electric quantity and is also electrically connected to the bulb to control its opening and closing.

The installation component includes:

A plastic mounting part is located in the plastic anti-ironing part; and

A sealing silicone ring is set on the surface of the plastic mounting part;

The power supply component includes:

A circuit board is arranged on the plastic mounting part; and

A battery is arranged on and electrically connected to the circuit board, it is also electrically connected to the bulb to realize the power supply;

The auxiliary component includes:

A switch is set on the circuit board and is electrically connected to the bulb to control its opening and closing; and A power display light is set on and is electrically connected to the circuit board to display the battery power.

In embodiments, the thermal energy conversion power generation mechanism includes:

A metal connector is located in the plastic anti-ironing part;

A supporting component is arranged on the metal connector; and

A thermal energy conversion component is arranged on the supporting component.

The supporting component includes:

A plastic supporting part is arranged in the metal connector; and

A sealing ring is arranged on the surface of the metal connector and is fitted with the inner wall of the plastic anti-ironing part;

The thermal energy conversion component includes:

A heat dissipation metal sheet is arranged on the plastic mounting part and connected with the plastic supporting part; and A thermoelectric power generation sheet is set in the plastic supporting part and electrically connected to the circuit board.

In embodiments, the thermal energy conversion component also includes:

A charging port is set on the circuit board and electrically connected to it, which is a peripheral charging and acts as a mobile power supply.

In embodiments, the thermal energy conversion component also includes:

A brightening mechanism is set on the plastic anti-ironing part to increase the brightness of the bulb.

In embodiments, the brightening mechanism includes:

A plane lens is arranged on a plastic anti-ironing part; and

A reflecting cup is arranged on the bulb and connected to the plane lens.

In embodiments, the brightening mechanism also includes:

A silicon film is located on the plastic anti-ironing parts with multiple labels on its surface; and A handle is hinged on the cup body and is located at the bottom.

In summary, due to the above technical solutions, the beneficial effect of the invention is:

The hot water is stored in the cup body, and then inverts the cup body and export the heat of the hot water through the metal connector, and the heat is dissipated by heat dissipation metal sheets to generate a temperature difference so that the thermoelectric power generation sheet converts the thermal energy into electric energy and stores the electric energy in the battery. The stored electric energy can be used for bulb lighting, and at the same time can be used as a mobile power supply to carry out emergency supplementary electric energy for external products, so the heat can be converted and used, it is very environmentally friendly and also be used in an emergency.

The external products can be charged through the charging port, and electric energy is stored in the battery. The electric energy is stored in the battery for lighting the bulb and can be used as a mobile power supply at the same time. When lighting is needed, turn on the flashlight switch, and the bulb can be lit through the power supply of the battery, which can be used for outdoor emergencies.

Marks in the figures are cup body 1, plastic anti-ironing part 2, plane lens 3, reflecting cup 4, bulb 5, circuit board 6, battery 7, sealing silicone ring 8, plastic mounting part 9, heat dissipation metal sheet 10, thermoelectric power generation sheet 11, plastic supporting part 12, metal connector 13, sealing ring 14, handle 15, silicon film 16, switch 17, power display light 18, charging port 19.

DETAILED DESCRIPTION OF THE EMBODIMENTS

To make the purpose, technical solution, and advantages more clear, the invention is further described in detail in combination with the attached drawings and the embodiment. It should be understood that the embodiment described here is intended to explain the invention only and is not used to limit the invention.

Embodiment 1

Figure 1:
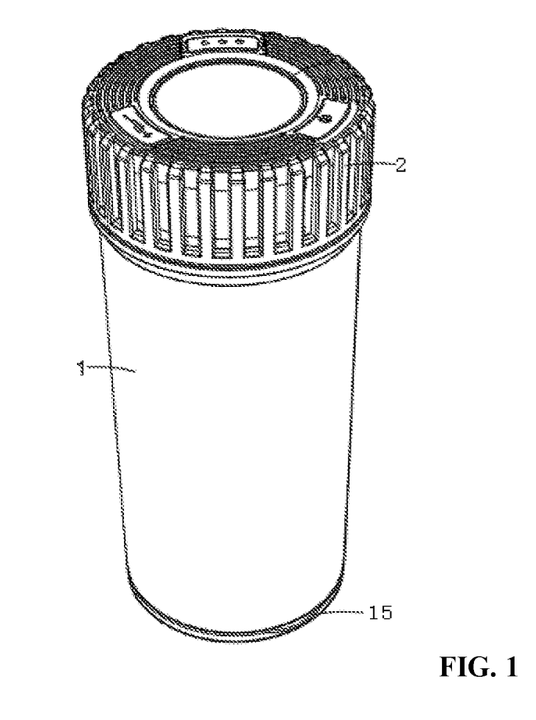
FIG. 1 is a stereogram in the front view of the invention.
Figure 2:
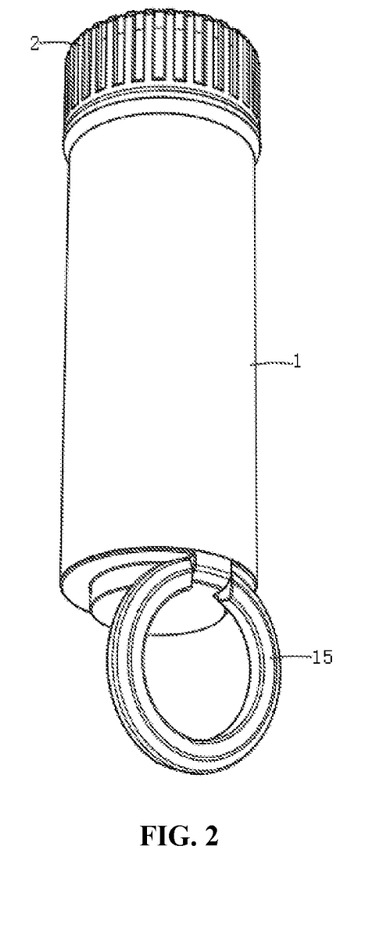
FIG. 2 is a stereogram in the bottom view of the invention.
Figure 3:
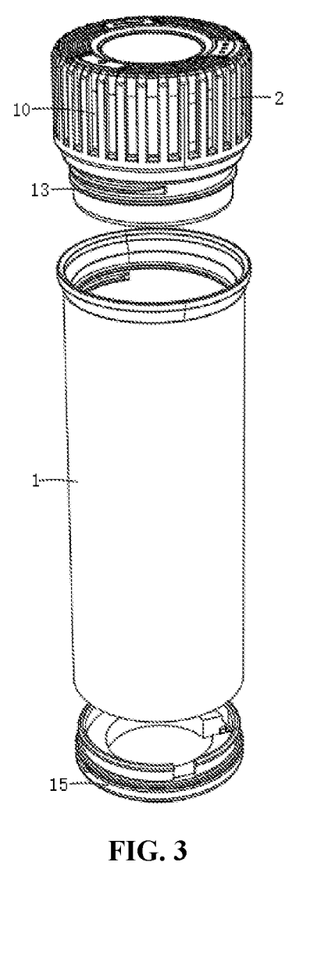
FIG. 3 is a partial explosion stereogram of the invention.
Figure 4:
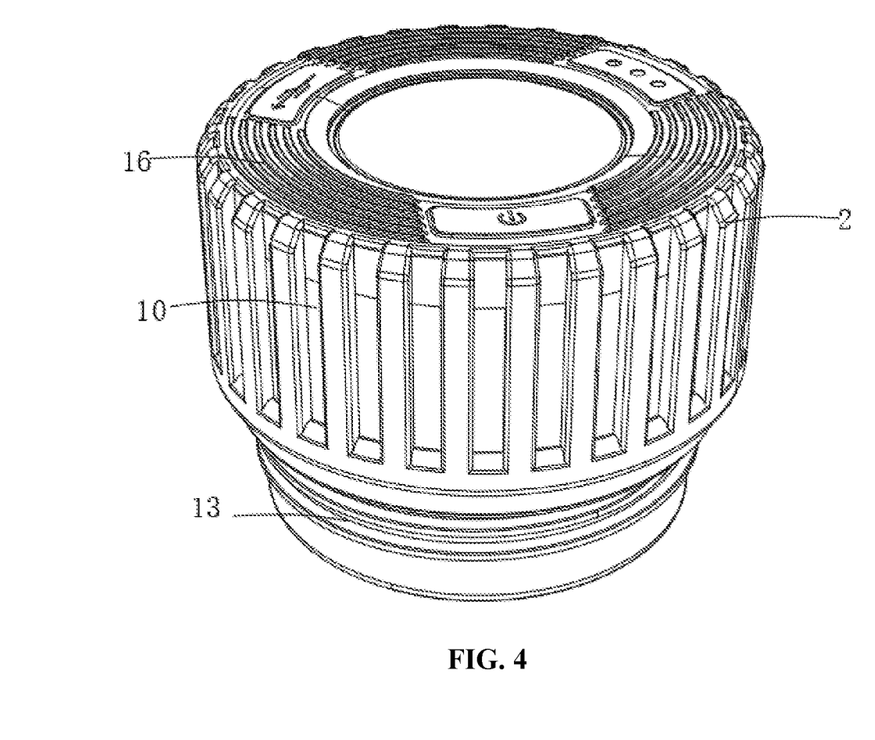
FIG. 4 is a partial structure stereogram in the front view of the invention.
Figure 5:
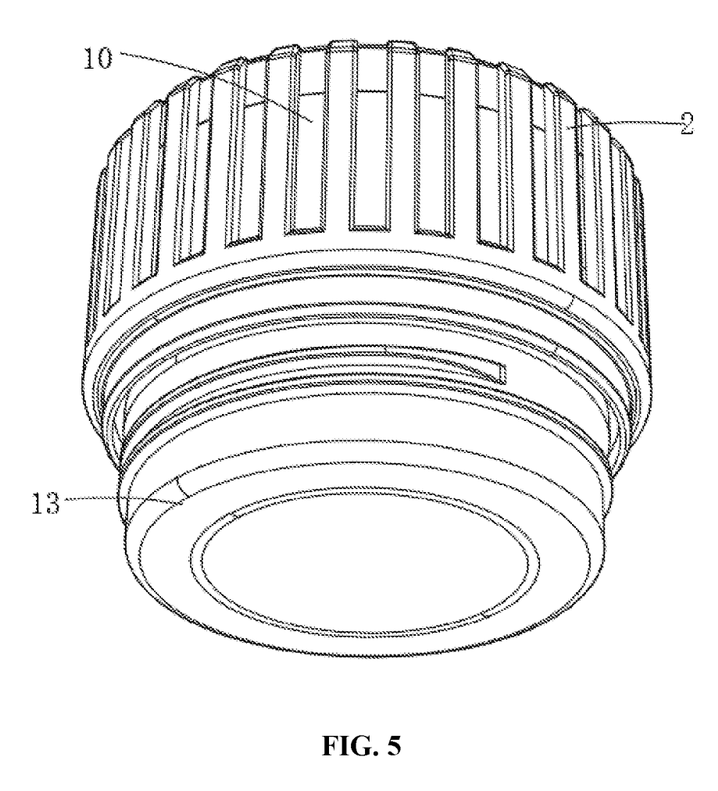
FIG. 5 is a partial structure stereogram in the bottom view of the invention.
Figure 6:
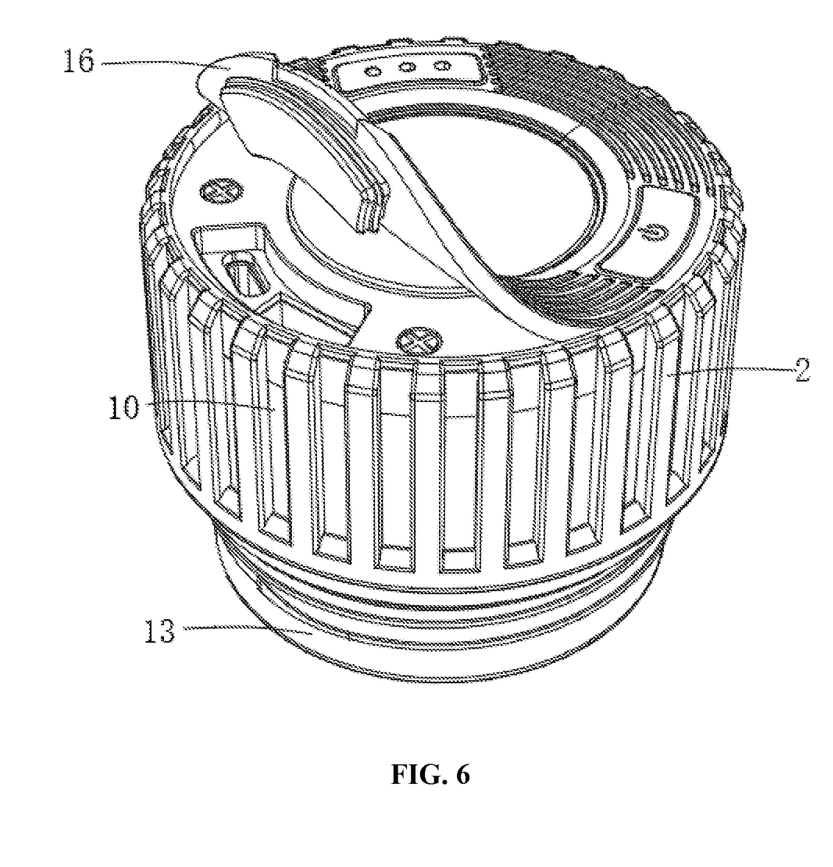
FIG. 6 is a partial structure expansion stereogram of the invention.
Figure 7:
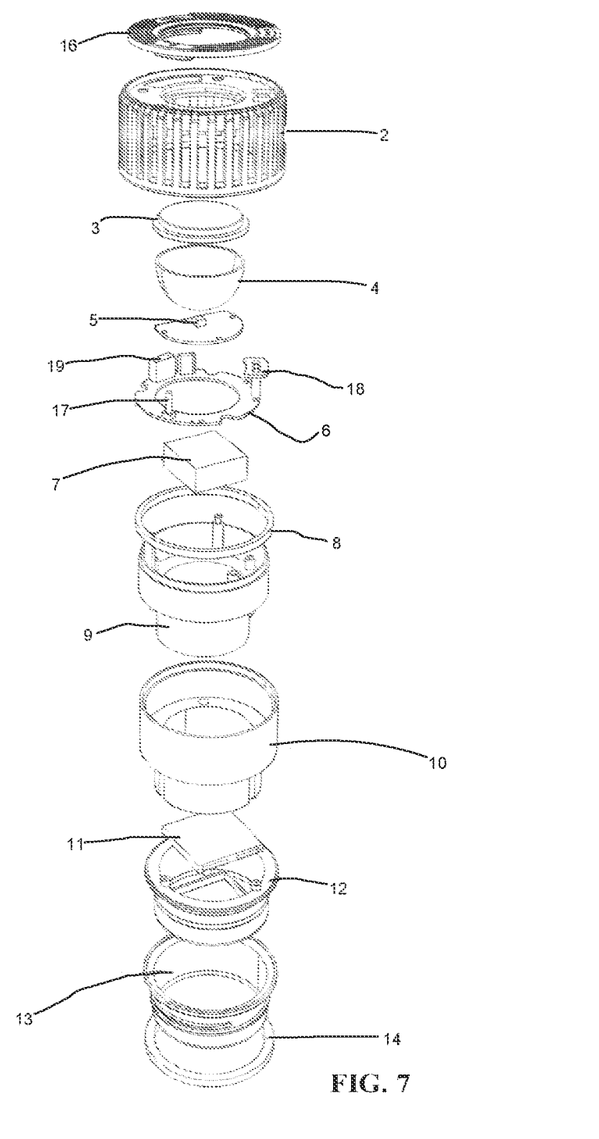
FIG. 7 is a partial structure explosion stereogram of the invention.

See FIG. 1-FIG. 7. The invention provides a technical solution that includes: a flashlight thermos cup body; a lighting mechanism is arranged on the flashlight thermos cup body for lighting; the thermal energy conversion power generation mechanism is set on the flashlight thermos cup body and is electrically connected with the lighting mechanism. It converts thermal energy into electrical energy to supply power for the lighting mechanism. The flashlight thermos cup body includes cup body 1; plastic anti-ironing part 2 is detachable on cup body 1.

In this embodiment, cup body 1 is a double-layer stainless steel thermos cup, the cup body 1 is set for storing water, the plastic anti-ironing part 2 is set on the outer surface of the cup body 1, the plastic anti-ironing part 2 is used for heat insulation and prevent users from being burned.

Specifically, the lighting mechanism includes: An installation component is set on the plastic anti-ironing part 2; A power supply component is arranged in the installation component line for power supply; A bulb 5 is arranged on the power supply component and electrically connected thereto for illumination, and an auxiliary component is arranged on and electrically connected to the power supply component to display its electric quantity and is also electrically connected with the bulb 5 to control its opening and closing.

In this embodiment: the installation component is set for the installation of the power supply component, bulb 5 is set to provide bright light which can be lit by the electricity provided by the power supply component, the power supply component can not only control switch of bulb 2 but also display the power situation at the same time.

Specifically, the installation components include: A plastic mounting part 9 is located in the plastic anti-ironing part 2, and a sealing silicone ring 8 is set on the surface of the plastic mounting part 9; The power supply component includes: A circuit board 6 is arranged on the plastic mounting part 9, and a battery is arranged on and electrically connected to the circuit board 6, it is also electrically connected with the bulb 5 to realize power supply; The auxiliary component includes: A switch 17 is set on the circuit board 6 and is electrically connected to the bulb 5 to control its opening and closing, and a power display light 18 is set on and is electrically connected to the circuit board 6 to display the battery 7 power.

In this embodiment, the top of the plastic mounting part 9 is fixedly connected to the top of the plastic anti-ironing part 2 to support battery 7. The setting of battery 7 is used for the power supply and storing electric energy. The outer surface of the sealing silicone ring 8 is bonded to the inner wall of the plastic anti-ironing part 2. The setting of the sealing silicone ring 8 is used to increase the sealing performance of the plastic mounting part 9 installation. The setting of the plastic mounting part 9 is used to install and support circuit board 6. The bulb 5, switch 17 and the power display light 18 are all-welded to the top of the circuit board 6.

Specifically, the thermal energy conversion power generation mechanism includes: A metal connector 13 is located in plastic anti-ironing part 2; A supporting component is arranged on the metal connector 13, and a thermal energy conversion component is arranged on the supporting component.

In this embodiment, the top of the metal connector 13 is fixed between the inner wall of the plastic anti-ironing part 2, the bottom of the metal connector 13 and the top of the cup body 1 are in a threaded connection, and the setting of the metal connector 13 is used for heat conduction, and the setting of the thermal energy conversion component can convert the thermal energy, to make rational use of the heat.

Specifically, the supporting component includes: A plastic supporting part 12 arranged in the metal connector 13, and a sealing ring 14 is arranged on the surface of the metal connector 13 and is fitted with the inner wall of the plastic anti-ironing part 2; The thermal energy conversion component includes: A heat dissipation metal sheet 10 is arranged on the plastic mounting part 9 and connected with the plastic supporting part 12; And a thermoelectric power generation sheet 11 is set in the plastic supporting part 12 and electrically connected to the circuit board 6.

In this embodiment, the bottom of the plastic supporting part 12 is embedded between the inner walls of the metal connector 13, and the top of the plastic supporting part 12 is set on the outer surface of the heat-dissipation metal sheet 10. The setting of the plastic supporting part 12 is used to support the thermoelectric power generation sheet 11, and the thermoelectric power generation sheet 11 is fixedly embedded between the inner walls of the plastic supporting part 12. The thermoelectric power generation sheet 11 converts the thermal energy into electric energy and stores the electric energy in the battery 7. The setting of the sealing ring 14 is used to increase the sealing performance of the plastic anti-ironing part 2.

Specifically, it also includes: A charging port 19 is set on the circuit board 6 and electrically connected to it, which is a peripheral charging and acts as a mobile power supply.

In this embodiment, the charging port 19 is welded to the top of circuit board 6. The charging port 19 is equipped with a type-C interface and a USB interface for charging the battery 7, and they can also be used as an external product charging interface.

Specifically, it also includes: A brightening mechanism is set on the plastic anti-ironing part 2 to increase the brightness of the bulb 5. The brightening mechanism includes: A plane lens 3 is arranged on a plastic anti-ironing part 2, and a reflecting cup 4 is arranged on bulb 5 and connected with plane lens 3.

In this embodiment, the plane lens 3 is embedded in the upper inner wall of the plastic anti-ironing part 2, one end of the reflecting cup 4 is fixedly connected with the bulb 5, and the other end of the reflecting cup 4 is fixedly connected with the bottom of the plane lens 3. The plane lens 3 is used for light transmission, and the reflecting cup 4 is arranged for light concentration, which can increase the light brightness.

Specifically, it also includes a silicon film 16 located on the plastic anti-ironing part 2 with multiple labels on its surface; And a handle 15 is hinged on the cup body 1 and is located at the bottom.

In this embodiment, the silicon film 16 is embedded in the top of the plastic anti-ironing part 2, and the outer surface of the silicon film 16 is engraved with labels. The setting of the silicon film 16 can protect the charging port 19, and the labels correspond to the switch 17, the power display light 18, and the charging port 19, which is convenient for the user to identify. The setting of handle 15 can take the water cup upside down, which is beneficial to the conduction and conversion of thermal energy and can be hung up when used as a flashlight.

The detailed description of the using method of a portable flashlight thermos cup with a charging function provided by the embodiment is as follows. The using method includes the following steps: when storing hot water in cup body 1, water cup can be inverted through the handle 15 at the bottom of cup body 1, which is beneficial to the conduction and transformation of thermal energy. The metal connector 13 exports the heat of hot water and dissipates heat through the heat dissipation metal sheet 10 to produce a temperature difference. At the same time, the thermoelectric power generation sheet 11 converts the thermal energy into electrical energy and stores the electrical energy in the battery 7. The heat can be converted and used for lighting or acting as a mobile power supply in an environmentally friendly way. At the same time, battery 7 can also be charged from the outside through the charging port 19 as a mobile power supply. Switch 17 can be turned on when lighting is required. The power supply of battery 7 can light up bulb 5 light up. On the one hand, it is very environmentally friendly. On the other hand, it can also be used for outdoor emergencies.

The above-mentioned embodiment is a better case of the invention and is not used to restrict the invention. Any modification, equivalent replacement, and improvement made within the spirit and principle of the invention shall be included in the protection scope of the invention.

What is claimed is:

1. A portable flashlight cup with a charging function comprising:
   a flashlight cup body comprising
   a lighting mechanism on the flashlight cup body; and
   a thermal energy conversion power generation mechanism on the flashlight cup body electrically connected to the lighting mechanism, wherein the thermal energy conversion power generation mechanism converts a thermal energy into an electrical energy to supplying a power to the lighting mechanism;
   wherein the flashlight cup body comprises a cup body and a plastic part, wherein the plastic part is detachable from the cup body;
   wherein the lighting mechanism comprises an installation component set on a plastic part, a power supply component arranged in an installation component line and providing a power supply, a bulb arranged on the power supply component and electrically connected to the power supply component for an illumination, and an auxiliary component arranged on and electrically connected to the power supply component, wherein the auxiliary component displays an electric quantity of the power supply component and is electrically connected to the bulb to control an opening and a closing of the bulb; and
   wherein the installation component comprises a plastic mounting part located in the plastic part, and a sealing silicone ring set on a surface of the plastic mounting part, wherein the power supply component comprises a circuit board arranged on the plastic mounting part and a battery arranged on and electrically connected to the circuit board, wherein the battery is electrically connected to the bulb and provides the bulb with the power supply, and wherein the auxiliary component comprises a switch set on the circuit board, wherein the switch is electrically connected to the bulb and controls the opening and the closing of the bulb; and a power display light set on and electrically connected to the circuit board, wherein the power display light displays a power of the battery.

2. The portable flashlight cup with the charging function according to claim 1, wherein the thermal energy conversion power generation mechanism comprises:
   a metal connector located in the plastic part;
   a supporting component arranged on the metal connector; and
   a thermal energy conversion component arranged on the supporting component.

3. The portable flashlight cup with the charging function according to claim 2, wherein the supporting component comprises:
   a plastic supporting part arranged in the metal connector; and
   a sealing ring arranged on a surface of the metal connector and fitted with an inner wall of the plastic part;

wherein the thermal energy conversion component comprises:
a heat dissipation metal sheet arranged on the plastic mounting part and connected with the plastic supporting part; and
a thermoelectric power generation sheet set in the plastic supporting part and electrically connected to the circuit board.

4. The portable flashlight cup with the charging function according to claim 3, further comprising:
a charging port set on the circuit board and electrically connected to the circuit board, wherein the charging port is a mobile power supply.

5. The portable flashlight cup with the charging function according to claim 4, further comprising:
a brightening mechanism set on the plastic part, wherein the brightening mechanism increases a brightness of the bulb.

6. The portable flashlight cup with the charging function according to claim 5, wherein the brightening mechanism comprises:
a plane lens arranged on the plastic part; and
a reflecting cup arranged on the bulb and connected to the plane lens.

7. The portable flashlight cup with the charging function according to claim 6, further comprising:
a silicon film located on the plastic part, wherein a surface of the silicon film comprises multiple labels, and
a handle hinged on the cup body, wherein the handle is located at a bottom of the cup body.

8. The portable flashlight cup with the charging function according to claim 5, further comprising:
a silicon film located on the plastic part, wherein a surface of the silicon film comprises multiple labels; and
a handle hinged on the cup body, wherein the handle is located at a bottom of the cup body.

9. The portable flashlight cup with the charging function according to claim 4, further comprising:
a silicon film located on the plastic part, wherein a surface of the silicon film comprises multiple labels; and
a handle hinged on the cup body, wherein the handle is located at a bottom of the cup body.

10. The portable flashlight cup with the charging function according to claim 3, further comprising:
a silicon film located on the plastic part, wherein a surface of the silicon film comprises multiple labels; and
a handle hinged on the cup body, wherein the handle is located at a bottom of the cup body.

11. The portable flashlight cup with the charging function according to claim 2, further comprising:
a silicon film located on the plastic part, wherein a surface of the silicon film comprises multiple labels; and
a handle hinged on the cup body, wherein the handle is located at a bottom of the cup body.

12. The portable flashlight cup with the charging function according to claim 1, further comprising:
a silicon film located on the plastic part, wherein a surface of the silicon film comprises multiple labels; and
a handle hinged on the cup body, wherein the handle is located at a bottom of the cup body.

* * * * *